US011526537B2

(12) United States Patent
Bolton et al.

(10) Patent No.: US 11,526,537 B2
(45) Date of Patent: *Dec. 13, 2022

(54) METHOD AND SYSTEM FOR OPTIMIZING ELECTRONIC MAP DATA AND DETERMINING REAL PROPERTY DEVELOPMENT YIELD

(71) Applicant: Land Intelligence, Inc., Columbia, SC (US)

(72) Inventors: Raymond Gore Bolton, La Plata, MD (US); Sean Phelan, Great Mills, MD (US)

(73) Assignee: Land Intelligence, Inc., Columbia, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/952,895

(22) Filed: Nov. 19, 2020

(65) Prior Publication Data

US 2022/0004569 A1 Jan. 6, 2022

Related U.S. Application Data

(60) Continuation of application No. 15/425,512, filed on Feb. 6, 2017, now Pat. No. 10,929,442, which is a
(Continued)

(51) Int. Cl.
*G06F 16/29* (2019.01)
*G09B 29/00* (2006.01)
(Continued)

(52) U.S. Cl.
CPC .......... *G06F 16/29* (2019.01); *G06F 16/9537* (2019.01); *G09B 29/003* (2013.01); *G09B 29/007* (2013.01); *G09B 29/10* (2013.01)

(58) Field of Classification Search
CPC ... G06F 16/29; G06F 16/9537; G09B 29/003; G09B 29/007; G09B 29/10
(Continued)

(56) References Cited

U.S. PATENT DOCUMENTS

| 7,047,491 | B2 | 5/2006 | Schubert et al. |
| 7,353,114 | B1 | 4/2008 | Rohlf et al. |
| 2002/0069230 | A1 | 6/2002 | Schubert et al. |
| 2004/0260578 | A1 | 12/2004 | Jin |

(Continued)

*Primary Examiner* — Evan Aspinwall
(74) *Attorney, Agent, or Firm* — Morris, Manning & Martin, LLP; Adam J. Thompson

(57) ABSTRACT

Disclosed is a system method for aligning a plurality of electronic map data, which includes the steps of obtaining an electronic map file, defining an area of interest on the electronic map file, selecting a predetermined datum and providing the electronic map file in the predetermined datum. Also disclosed is a land yield method including the steps of obtaining an electronic map, storing the electronic map in a computer readable medium, defining an area of interest on the electronic map, referring to a database to determine whether the database contains at least one restriction value, referring to a remote database to determine whether the remote database contains an additional restriction value, the additional restriction value being distinct from the at least one restriction value, combining restriction values, and determining a total value of the parcel of land based on the combined restriction values.

20 Claims, 12 Drawing Sheets

Related U.S. Application Data division of application No. 11/979,420, filed on Nov. 2, 2007, now Pat. No. 9,569,462.

(60) Provisional application No. 60/924,204, filed on May 3, 2007, provisional application No. 60/882,174, filed on Dec. 27, 2006.

(51) Int. Cl.
*G09B 29/10* (2006.01)
*G06F 16/9537* (2019.01)

(58) Field of Classification Search
USPC .................. 706/46; 707/999.001, 741, 802
See application file for complete search history.

(56) References Cited

U.S. PATENT DOCUMENTS

| | | | |
|---|---|---|---|
| 2005/0027572 A1 | 2/2005 | Goshert | |
| 2005/0110800 A1* | 5/2005 | Putnam | G06F 16/29 |
| | | | 345/619 |
| 2005/0216242 A1 | 9/2005 | Flax et al. | |
| 2006/0101005 A1* | 5/2006 | Yang | G09B 29/007 |
| 2006/0173707 A1 | 8/2006 | Schubert et al. | |
| 2007/0067180 A1 | 3/2007 | James et al. | |
| 2007/0124159 A1* | 5/2007 | Moore | G06Q 30/02 |
| | | | 705/7.36 |
| 2007/0143345 A1* | 6/2007 | Jones | G06F 16/288 |
| 2008/0109196 A1* | 5/2008 | Remme | G06F 30/13 |
| | | | 703/11 |
| 2008/0249795 A1 | 10/2008 | Walker | |
| 2010/0289642 A1* | 11/2010 | Harrison | G09B 29/10 |
| | | | 340/541 |

* cited by examiner

METHOD AND SYSTEM FOR OPTIMIZING ELECTRONIC MAP DATA AND DETERMINING REAL PROPERTY DEVELOPMENT YIELD

CROSS REFERENCE TO RELATED APPLICATIONS

This application is a continuation of, and claims priority to U.S. patent application Ser. No. 15/425,512, filed Feb. 6, 2017, entitled "METHOD AND SYSTEM FOR OPTIMIZING ELECTRONIC MAP DATA AND DETERMINING REAL PROPERTY DEVELOPMENT YIELD," which is a continuation of U.S. Pat. No. 9,569,462, issued Feb. 14, 2017, entitled "Method and system for optimizing electronic map data and determining real property development yield," which claims the benefit of and priority to both U.S. Provisional Patent Application No. 60/882,174, filed Dec. 27, 2006, entitled "Land Acquisition and Asset Manger-LAM" and U.S. Provisional Patent Application No. 60/924,204, filed May 3, 2007, entitled "Land Acquisition and Asset Manager-LAM," which are each incorporated herein by reference in their entireties.

FIELD OF THE INVENTION

This invention is related to a method for optimizing electronic map data and a system for executing such a method.

BACKGROUND

Land acquisition software applications often require that an overlay map be placed over and aligned with an electronic display so that the map features are superimposed on the underlying electronically produced display. The map, for example, may comprise topographic and other fixed features such as roads and zoning detail while the electronic display may comprise variable population density information or unusable land area. This information may be obtained from a computer and displayed on an electronic device such as a cathode ray tube in the form of symbols. The overlay map must be properly aligned with the cathode ray tube if the electronic display symbols are to be properly located with respect to the map features. One way to accomplish this alignment is by manual adjustment; however this can be time consuming and is subject to human error, which can have serious consequences in land development. A need exists for a method and system for accomplishing this alignment automatically.

SUMMARY OF THE INVENTIVE ASPECTS

Disclosed is a method for aligning a plurality of electronic map data. The method includes the steps of obtaining an electronic map file, defining an area of interest on the electronic map file, selecting a predetermined datum and providing the electronic map file in the predetermined datum. The area of interest is stored in a computer readable memory. A second electronic map file is retrieved and a datum for the second electronic map file is determined. Also included in the method are the steps of determining whether the area of interest at least partially coincides with the second electronic map; and, in the case that the area of interest at least partially coincides with the second electronic map, determining whether the second datum corresponds with the first datum and converting the retrieved electronic map to the predetermined datum.

The method for aligning a plurality of electronic map data can be varied with the additional steps of determining a first datum that is associated with the first electronic map file, retrieving a retrieved electronic map file from a spider program (herein alternatively referred to as a "grabber") and selecting the predetermined datum such as WGS84. In the case of the first datum not conforming to the predetermined datum, the first datum is converted to the predetermined datum, after which the predetermined datum is optionally converted to a preferred user datum. Receiving the second electronic map file optionally includes determining whether the second electronic file map resides in a database; and, in the case of the second datum electronic file map not residing in a database, obtaining a corresponding map from an external source. In the case of the area of interest at least partially coinciding with the corresponding map from an external source. The method further includes storing the corresponding map from an external source in a computer readable medium.

The method for aligning a plurality of electronic map data can be combined with a feature for yielding the usable or unusable square footage of a property. This method includes referring to a remote database to determine whether the remote database contains a restriction value for the parcel of land. The restriction value is distinct from a second restriction value obtained either from the remote database or from a computer readable storage medium and combined with it to form a plurality of restriction values. Lastly, a total value of the parcel of land based on the plurality of restriction values is determined.

A land parcel development yield method includes obtaining an electronic map file, storing the electronic map file in a computer readable medium, defining an area of interest on the electronic map file, referring to a database to determine whether the database contains at least one restriction value for the parcel of land, referring to a remote database to determine whether the remote database contains an additional restriction value for the parcel of land, the additional restriction value being distinct from the at least one restriction value, combining the at least one restriction value with the additional restriction value to form a plurality of restriction values, and determining a total value of the parcel of land based on the plurality of restriction values. The restriction values can also alternatively or additionally represent an undevelopable amount of land, a developable amount of land or an impervious surface ratio. Further, the total value of the parcel of land can be the floor area ratio of the land.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
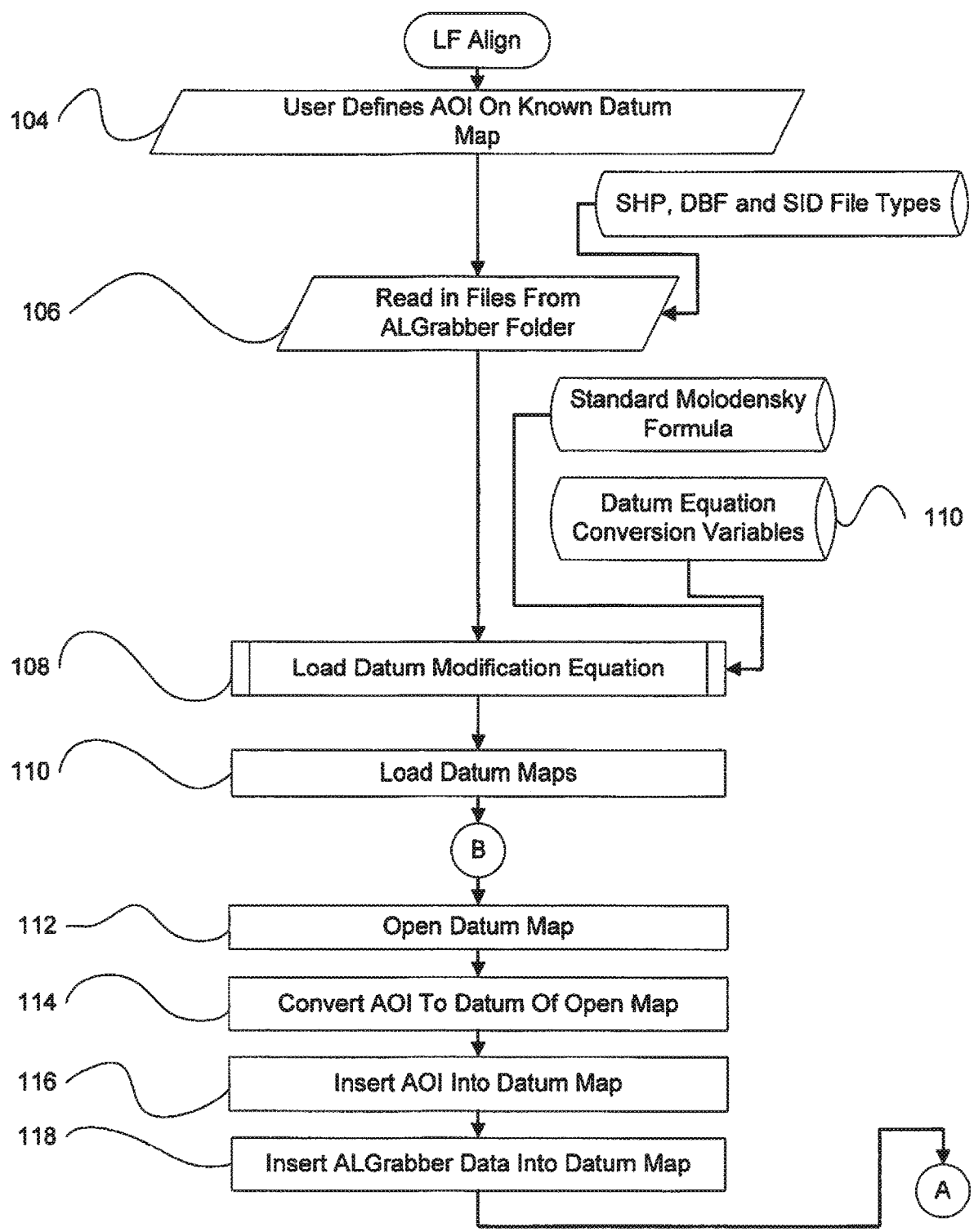
FIG. 1 is a flow chart showing a method for aligning a plurality of electronic map data.

With reference to the flow chart shown in FIG. 1 showing initial steps of a method for aligning a plurality of electronic map data, at step 104 a user defines an area of interest (hereinafter alternatively referred to as "AOI") for data location on a map for datum verification. At step 106, the system reads in a file from a file folder wherein a spider program (explained herein below) has previously stored various electronic map files. The file is typically an electronic map file; however, the file can also be a report on a particular parcel of land, wherein the report includes information regarding history, title, encumbrances and other features relating to the land. Also, the map file can be an image file, a digital file or any other representation of land. It is not necessary that geographic coordinate information be known at this time.

The spider program is an internet bot, in which an automated script obtains, analyzes and files information from web servers. Spider programs are mainly used to create a copy of visited pages for later processing by a search engine that will index the downloaded pages to provide fast future searches. Each server typically has rules for the spidering of that server that the bot is supposed to obey. For the purposes of the present inventive method, the spider searches remote servers for new and for updated electronic map files and files relating to characteristics of a parcel of land. The data obtained by the spider program is referred to as "grabber data".

Figure 2A:
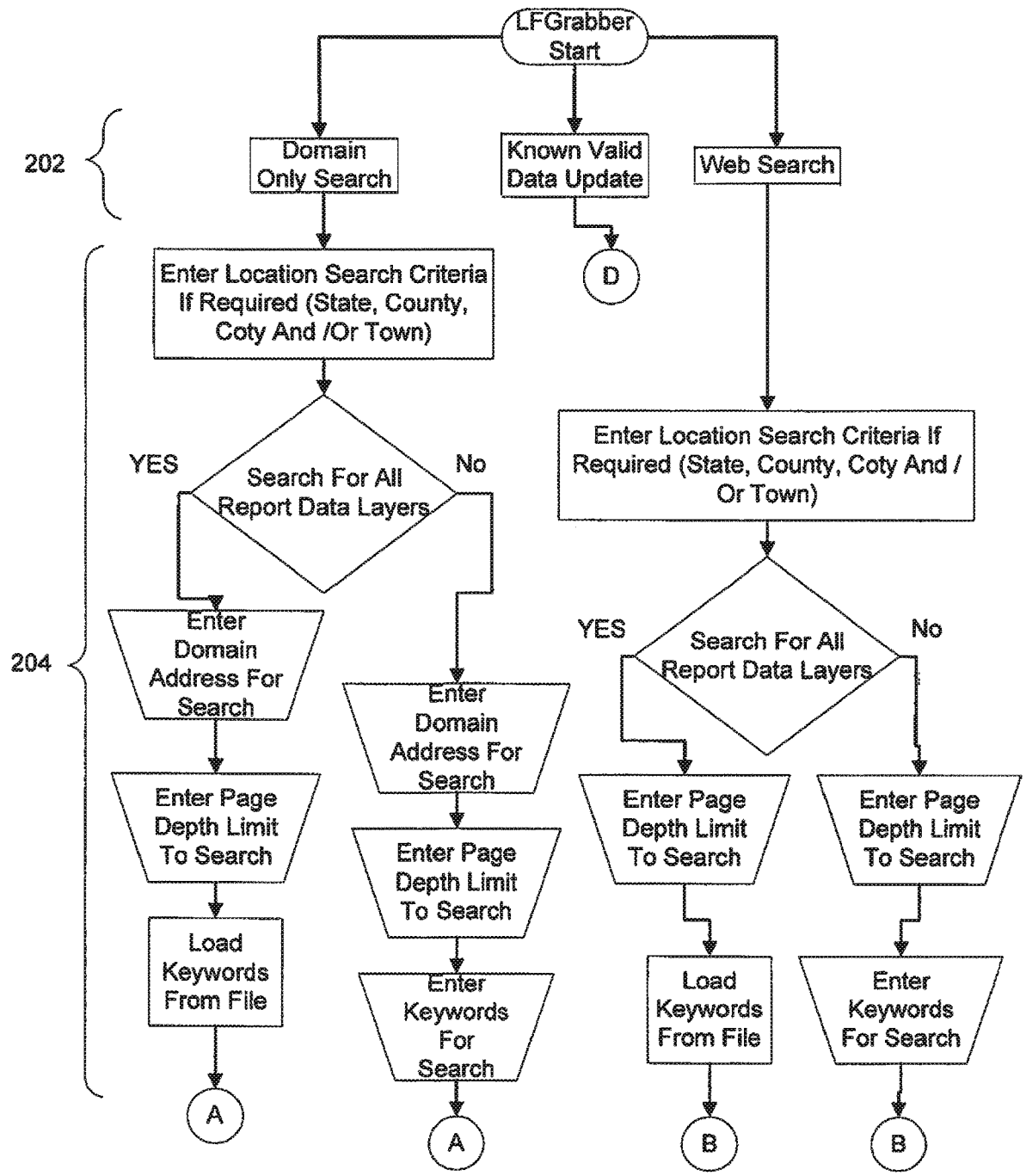
FIG. 2a is a flow chart showing a methodology of a spider/"grabber" program.

FIGS. 2a-2e are flow charts showing a methodology of a spider/"grabber" program. FIG. 2a shows the operation of a spider program. At level 202, the spider is configured to conduct either: a domain search, a search engine search, or a known valid data update check. With respect to the domain and search engine searches, at level 204, the system uses keywords to search for domain addresses through a specified page depth in a domain search; or, in a search engine search, determines a page depth to search and searches each identified site of the search engine.

Figure 2B:
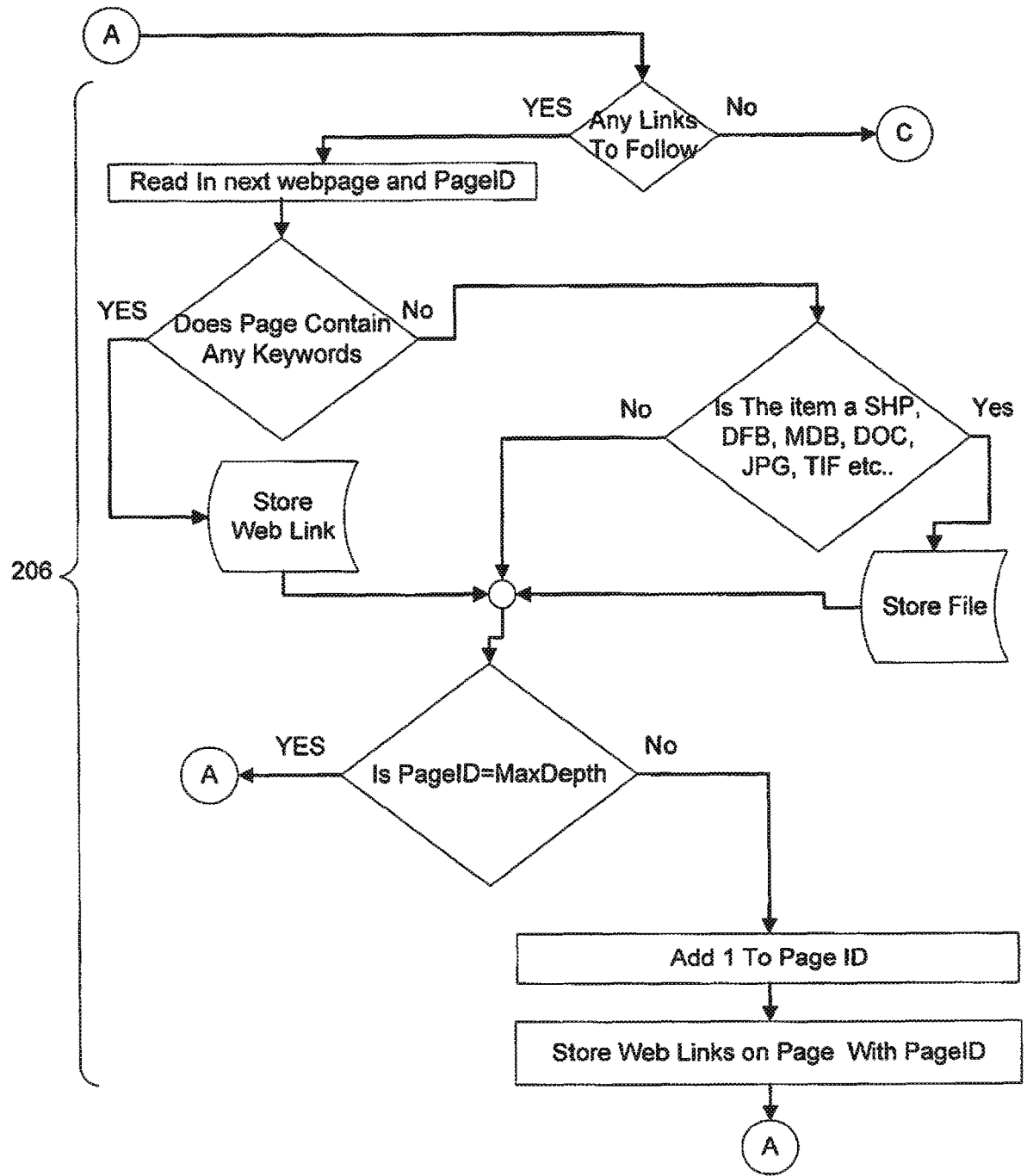
FIG. 2b is a flow chart showing a methodology of a spider/"grabber" program.
Figure 2C:
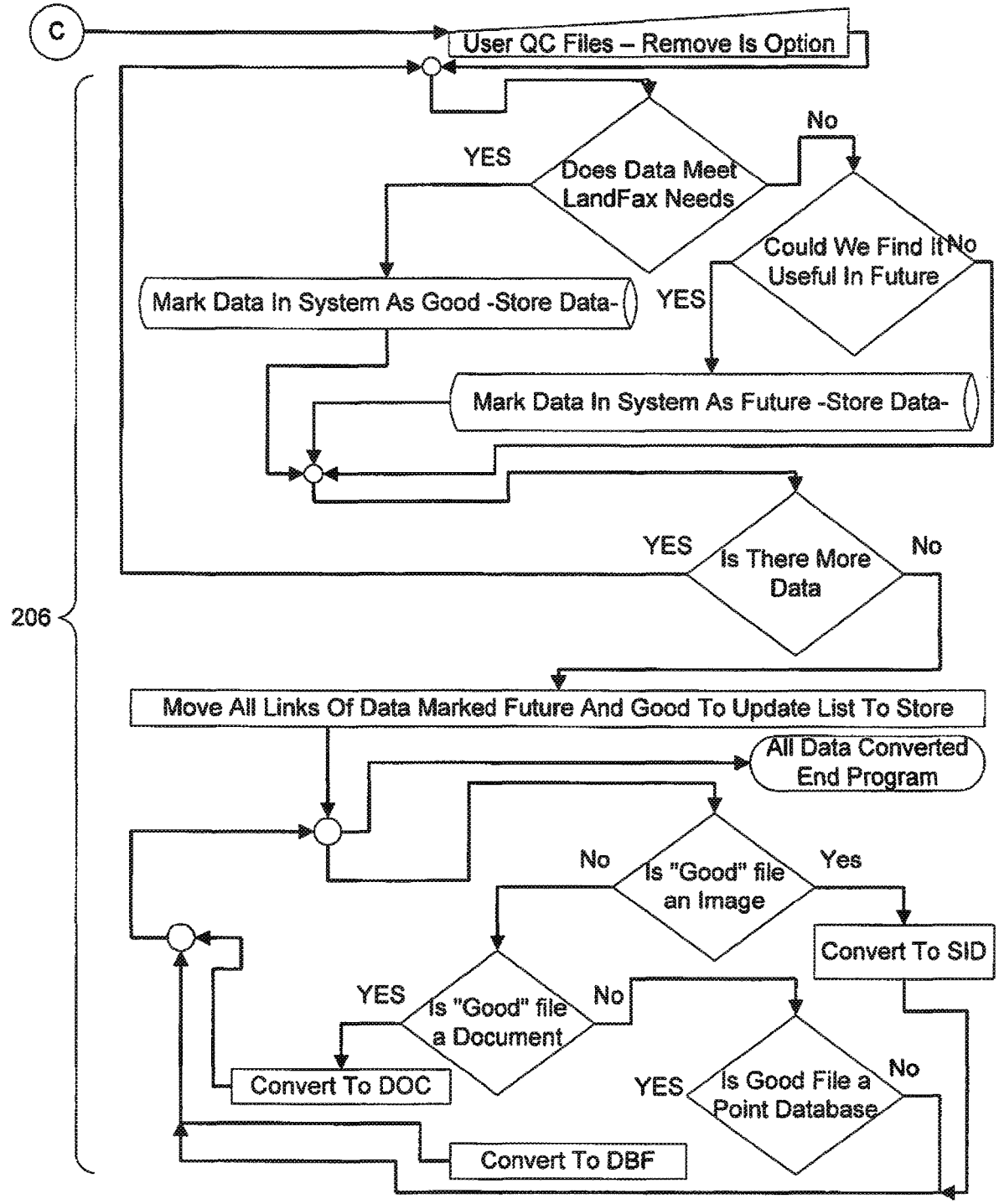
FIG. 2c is a flow chart showing a methodology of a spider/"grabber" program.
Figure 2D:
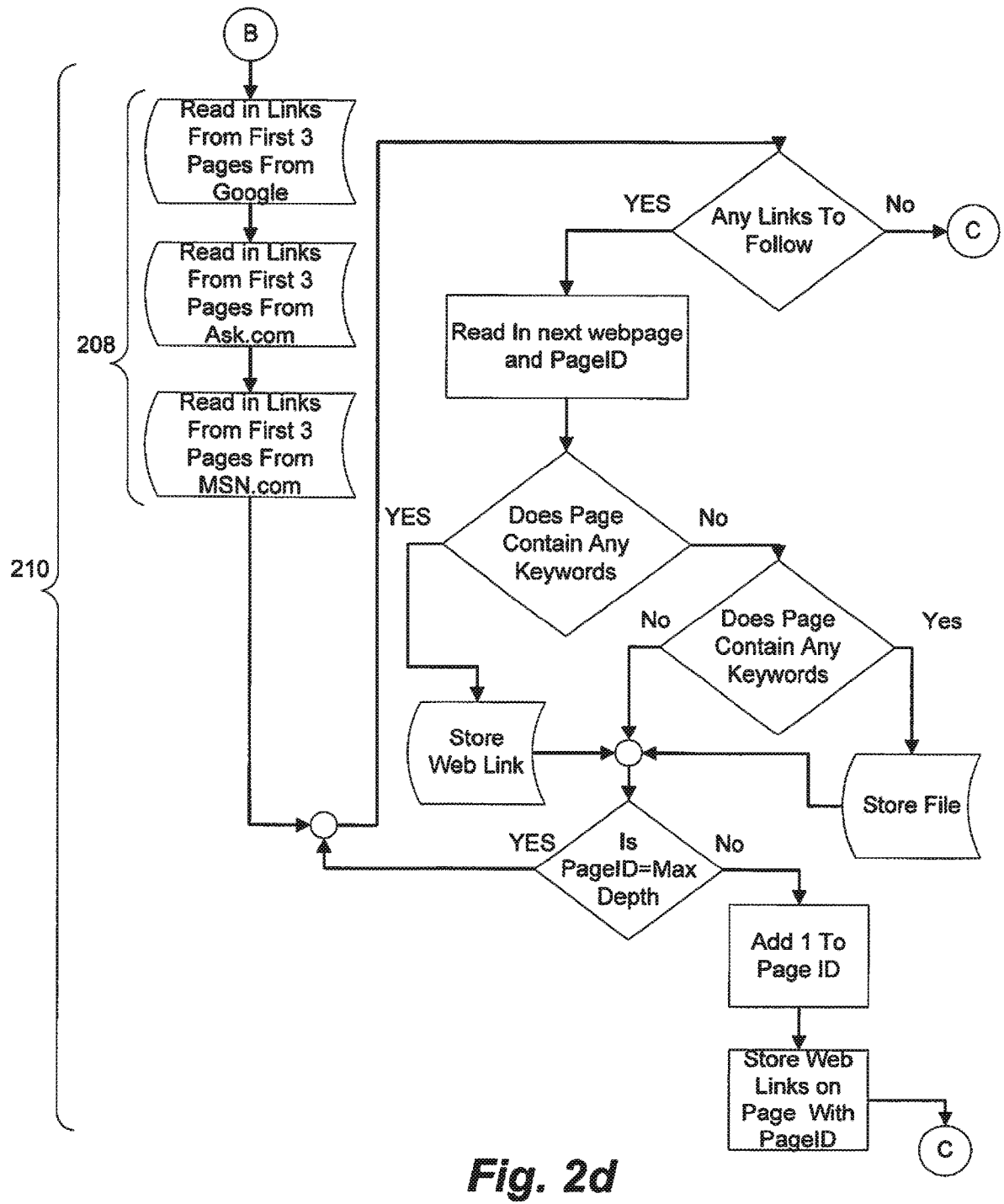
FIG. 2d is a flow chart showing a methodology of a spider/"grabber" program.

With further respect to the domain search and with respect to FIGS. 2b and c, at level 206, the system searches domain names until it finds a domain name matching the keywords inserted by the user. If the keywords match, the page and web location are stored and the system continues searching until the maximum page depth is reached. If there are no pages that match the keyword, the system determines whether any of the pages searched are non-text files such as .pdf files, jpg files, zip files, etc. If the files are non-text files, the system stores the page and web address for later consideration and user manipulation, e.g., manual map alignment. If the files are not non-text files or after the non-text files have been stored, the system then continues searching for keyword matches until the maximum page depth has been reached. The search engine search differs from the domain search, as shown in FIG. 2d, in that in a domain search, the system at level 208 searches web addresses for keyword matches before looping (at level 210) until the maximum page depth is reached whereas the search engine search searches web pages.

Figure 2E:
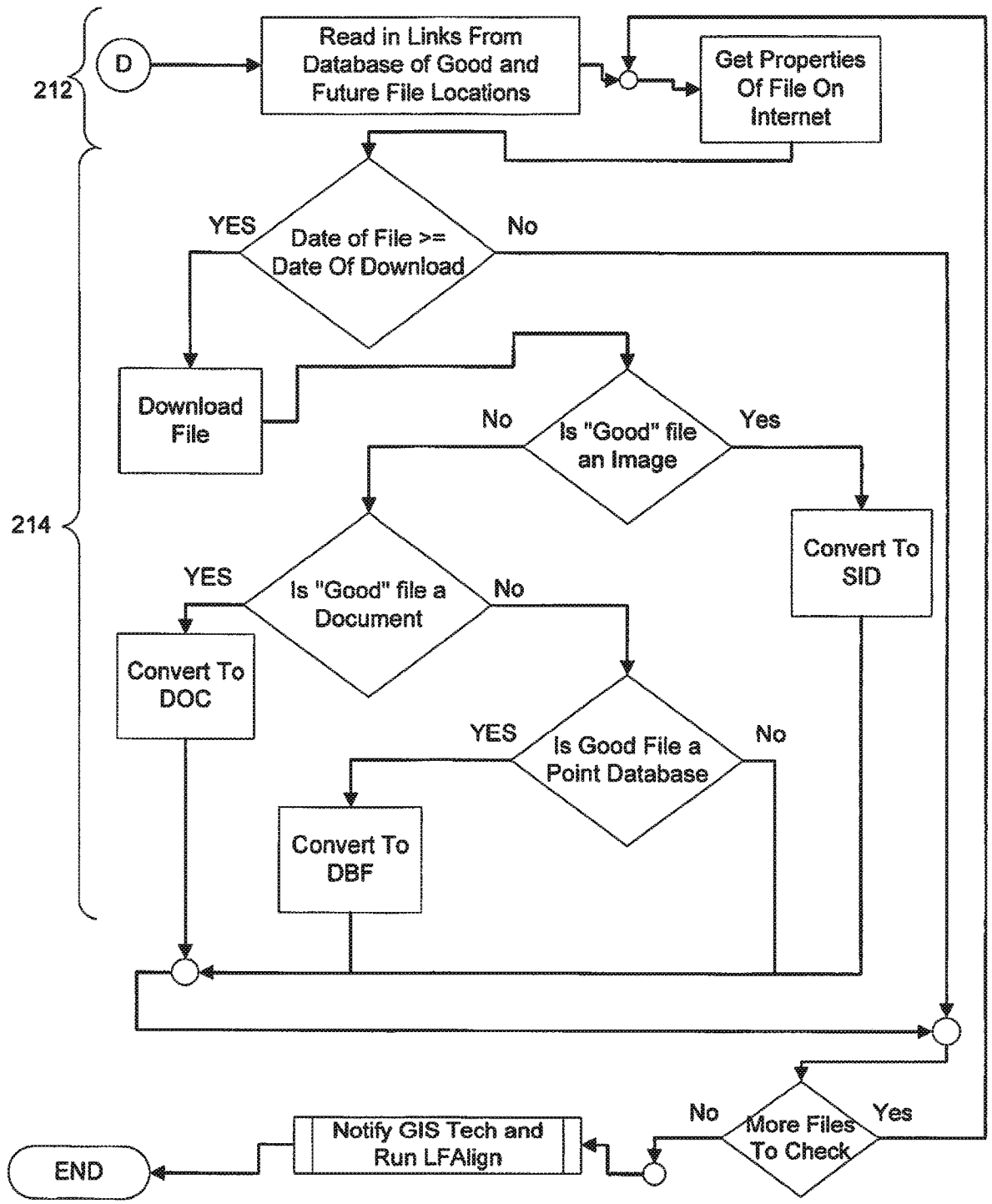
FIG. 2e is a flow chart showing a methodology of a spider/"grabber" program.

With further reference to the known valid data update check, as shown in FIG. 2e, the system refers to "good links" that have been previously identified as web addresses that can provide useful information relating to property characteristics and/or use. The system maintains the last date the good link web address was saved in the system. At level 212, the system refers to a good link for a particular file and identifies the last date that the file was updated. If the file has not been updated since the date maintained in the system, the system checks another "good link" to determine whether any updates have occurred since the last date the file was saved. If the file has been updated since the date maintained in the system, the system downloads the updates and saves them in place of the previous version of the file. At level 214, the system determines whether the updated good link remains a "good link," i.e. whether the web address is one that can continue to provide useful information. If the web address can continue to provide useful information, the system moves to the next web address file and continues updating the links. If not, the system notes the file for user review to determine whether the file must be removed. Ultimately the spider program stores its keyword search results in a computer readable file that is accessible to the system.

Map files in any electronic or non-electronic format and in any coordinate system, known or unknown, can be converted to a desired display format and/or a desired coordinate system. For example, map files can be converted into and displayed as .shp files, .shx files or .dbf files. A "shapefile" commonly refers to a collection of files with ".shp," ".shx," ".dbf," and other extensions on a common prefix name (e.g., "lakes."). Shapefiles spatially describe points, polygons or polylines, which can, for example, represent water wells, lakes and rivers, respectively. Each item may also have attributes that describe the items, such as name or temperature. DBF format is used for spatial data in a geographic information system to store feature attribute data. SID image format is used for raster images. With SID format, massive image data can be partitioned and displayed as satellite imagery in map software.

At steps 110 and 112, datum maps are loaded into the system and opened. At steps 114 and 116, the area of interest is converted to the current datum of the electronic map file and inserted into the electronic map file. Then, "grabber data" in question, i.e., the data identified in step 106 that is intended to be aligned, is inserted into the electronic map file, at step 118.

With further reference to FIG. 1, at step 108 the system loads a datum modification equation, which can be but is not limited to a datum transformation known as the standard Molodensky formula, a formula for transforming geodetic coordinates from one datum to another. The Standard Molodensky formula is used to convert latitude, longitude, and ellipsoid height in one datum to another datum. Alternative datum modification equations can be used as well. In any case, geographic coordinate variables are stored in a look up table in the system for easy access.

Figure 3:
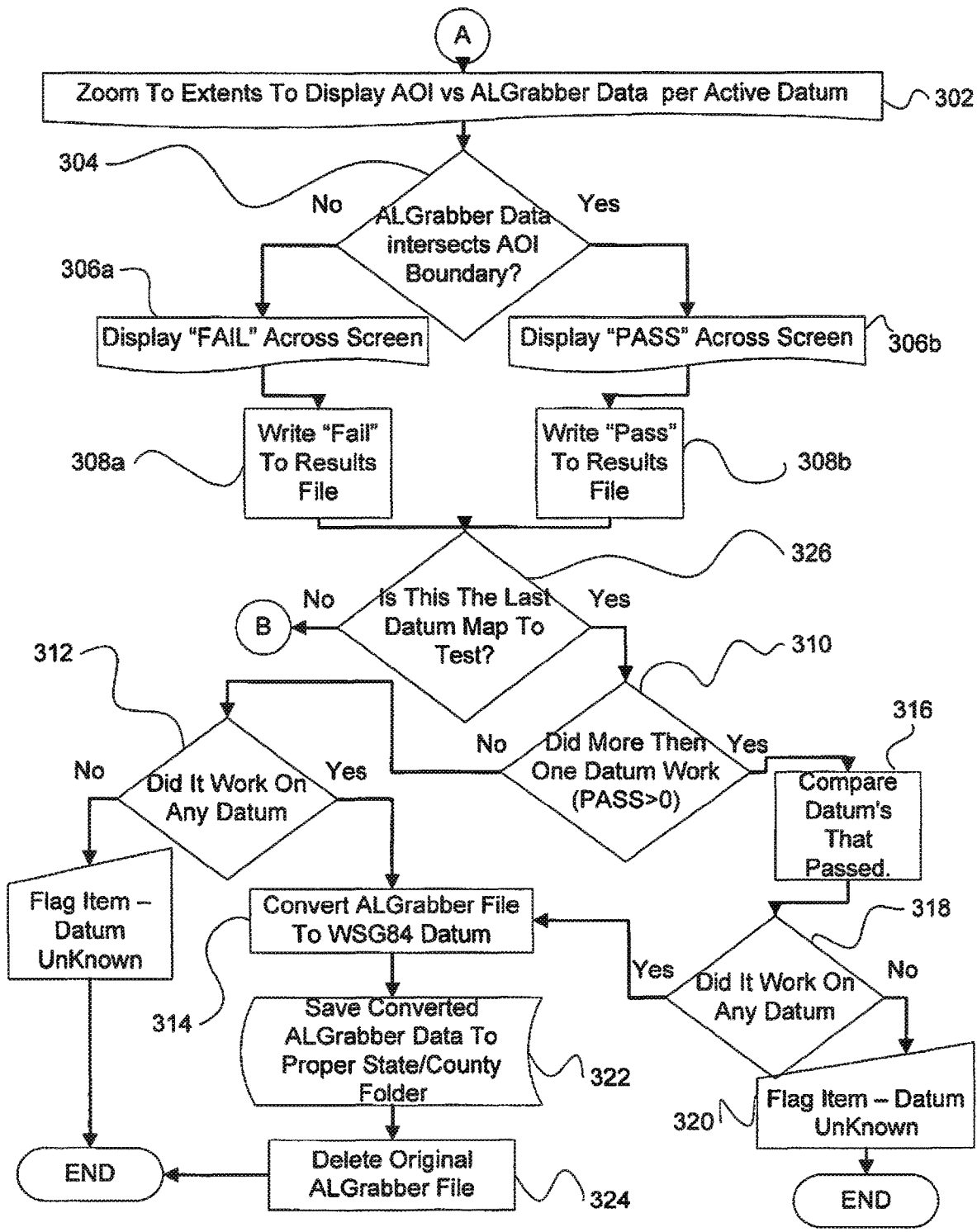
FIG. 3 is a flow chart showing a method of comparing electronic map data in an area of interest to "grabber data" obtained by the spider program.
Figure 4A:
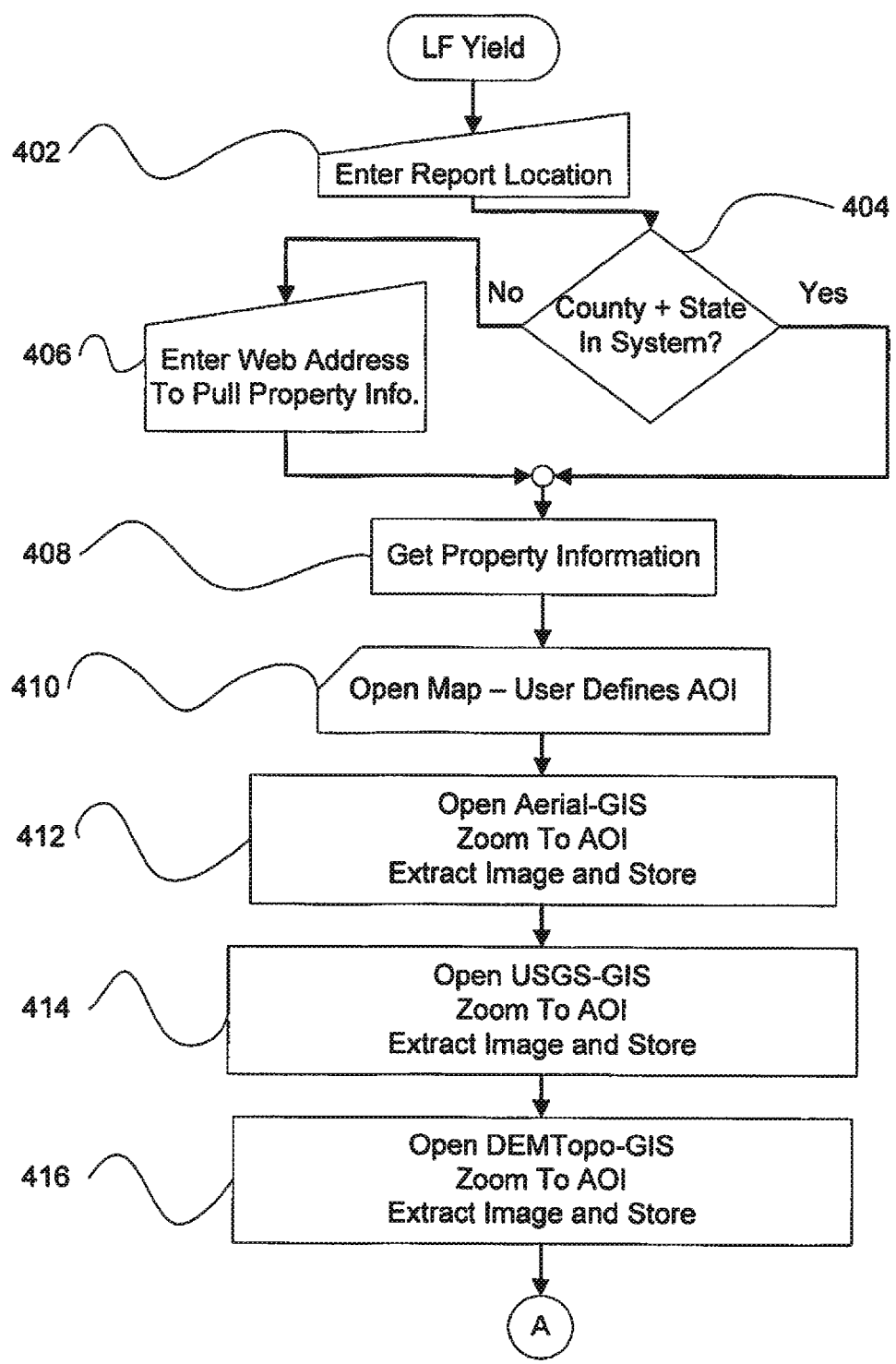
FIGS. 4a-4d are a further flow chart showing a method of providing a development yield for a property.
Figure 4B:
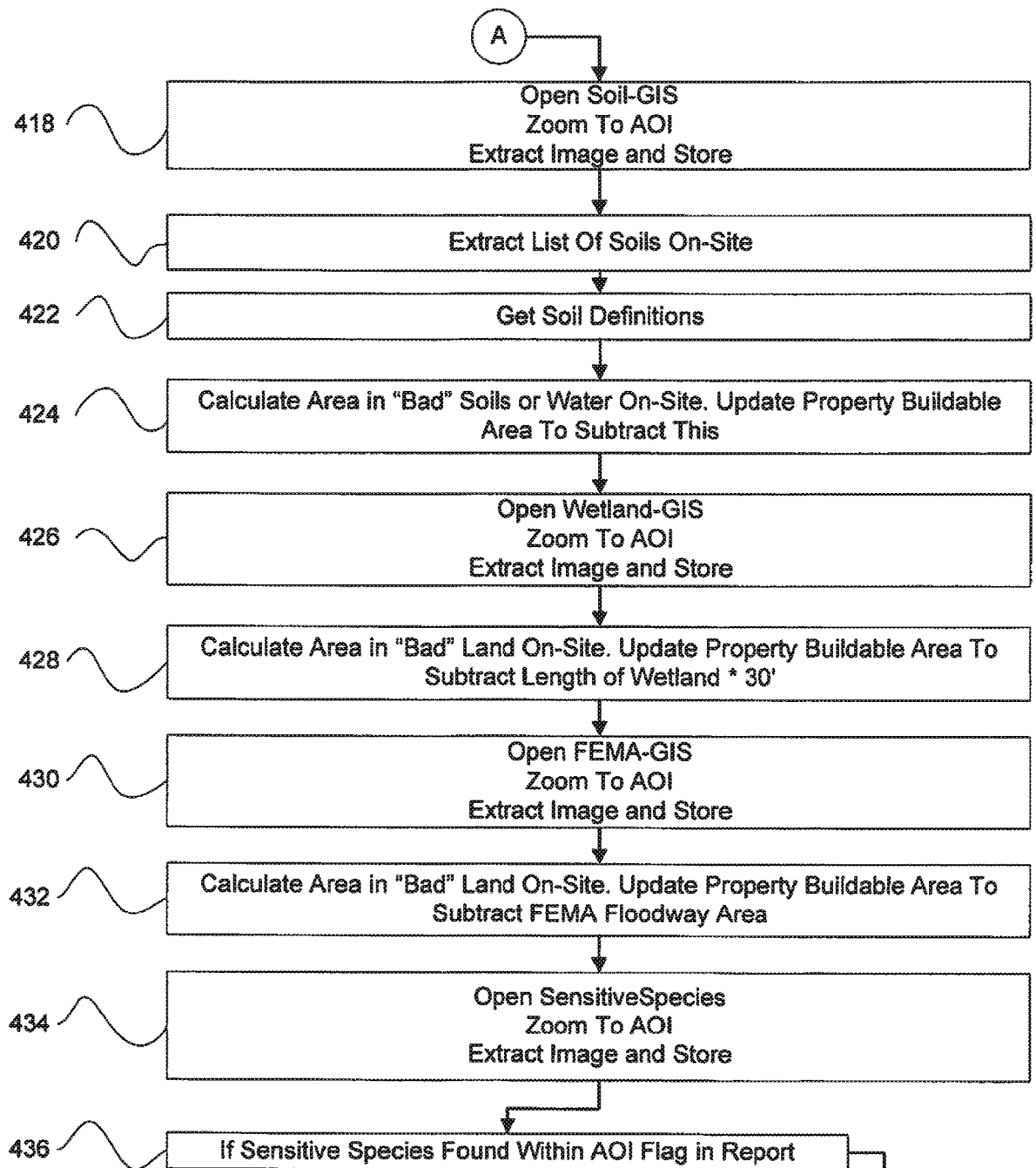
Figure 4C:
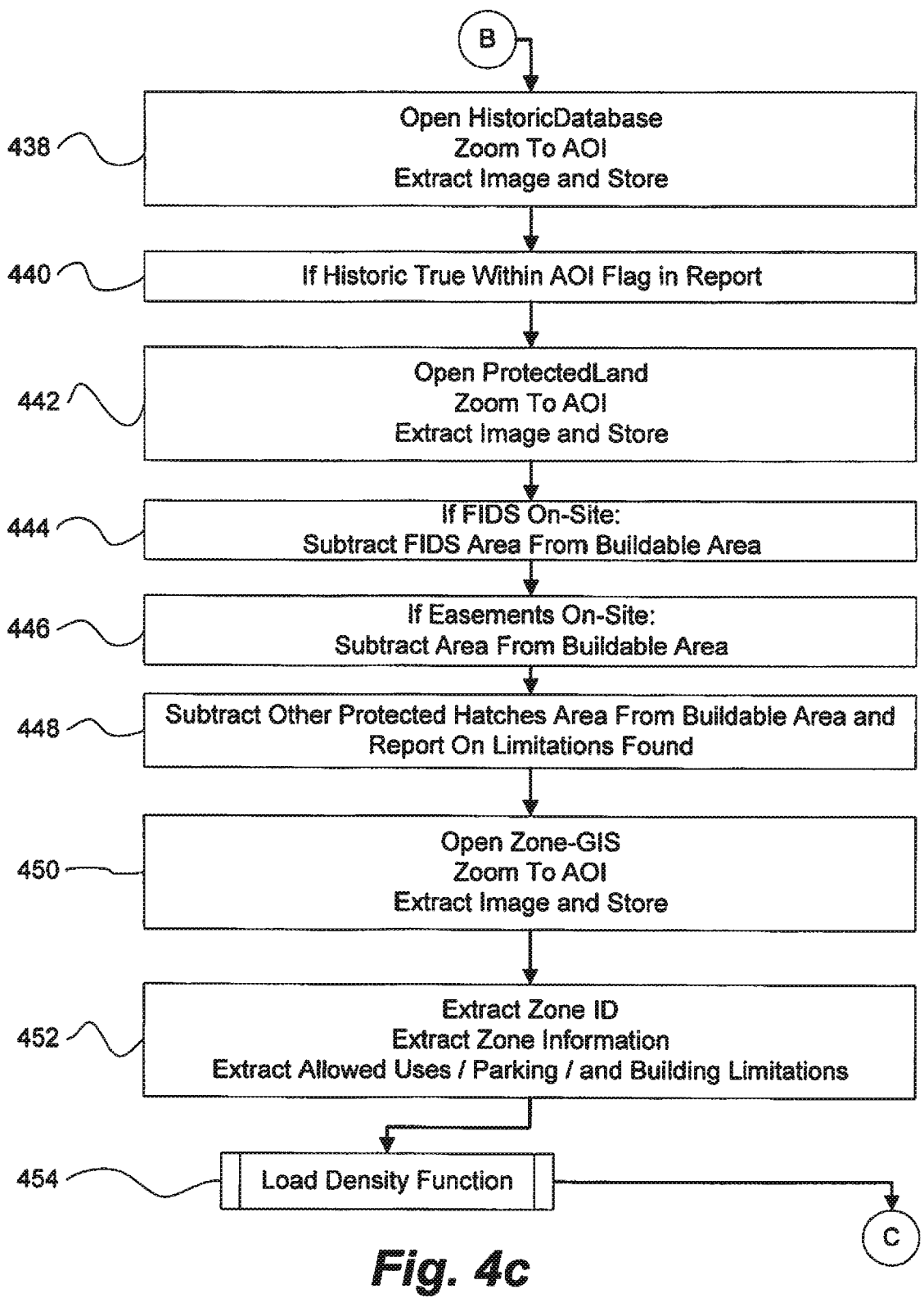
Figure 4D:
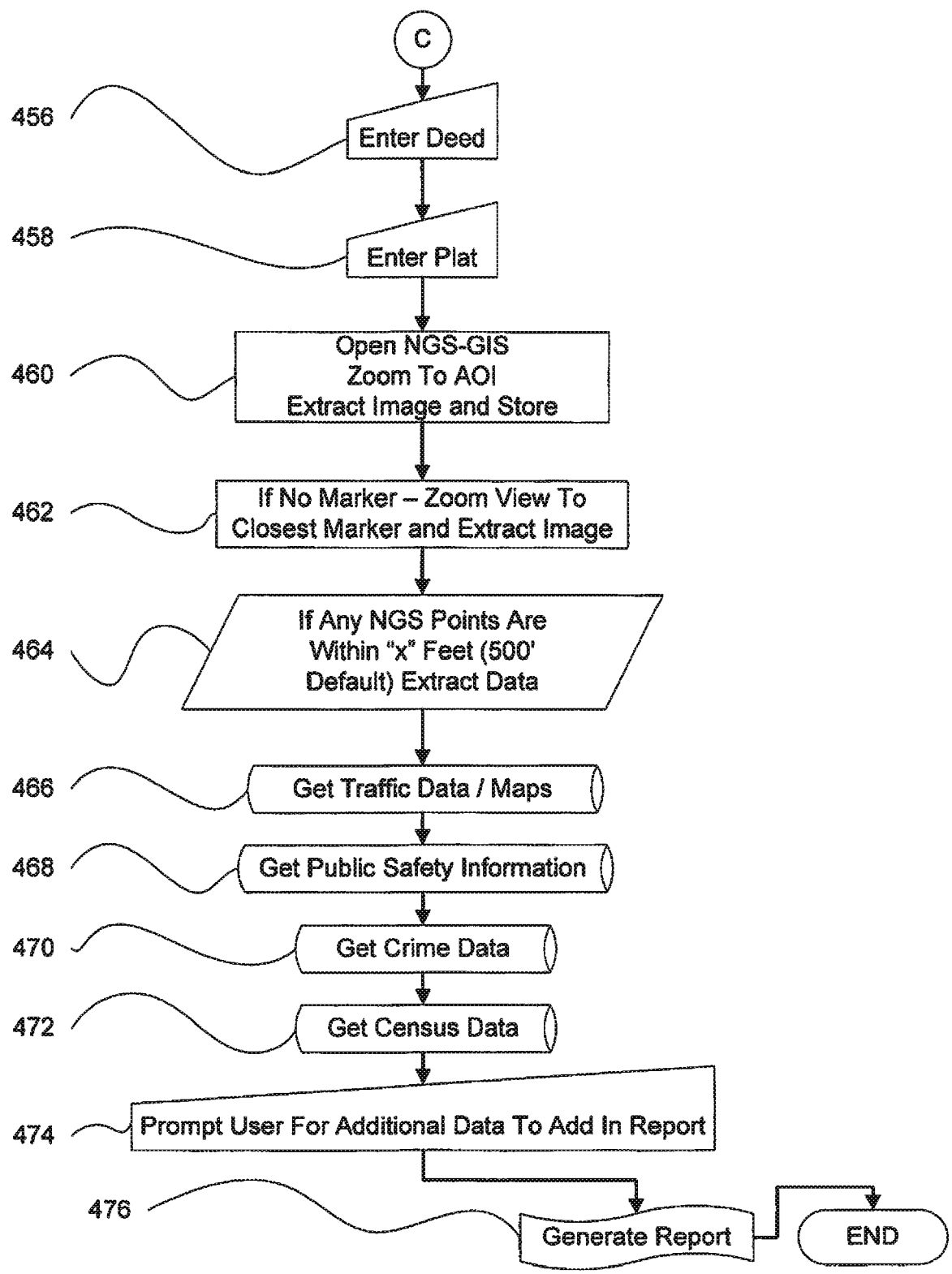

With reference to FIG. 3, after (or while) the "grabber data" is inserted into the electronic map file, a user distraction feature is available to entertain the user while the data is loading. To this end, an animated zoom feature can be displayed onscreen at step 302. At decision step 304, the system determines whether "grabber data", the data received from the spider program, is located within the area of interest. If the "grabber data" is not located within the area of interest, the system displays "FAIL" onscreen at step 306 a and writes a "fail" identifier tag to the "grabber" file at step 308 a. If the "grabber data" is within the area of interest, the system displays "PASS" onscreen at step 306 b and writes a "pass" identifier tag to the "grabber" file at step 308 b.

A list of maps already in the system's memory is checked at step 326 to determine if the "grabber data" is already available on a local database or otherwise referenced in a local database. If the "grabber data" is not in the system's database, then the system continues to loop until it finds a data that coincides with desired information for the area of interest. If the "grabber data" is available, on the local database or is otherwise referenced, the program retrieves the data. If the last datum map is not in the system's memory, the routine returns to step 112. If the last datum map is in the memory, however, the system considers whether the number of pass identifier tags is greater than 1 at decision step 310. If the number of pass identifier tags is less than or equal to one, the system then determines at step 312 whether there are any pass identifier tags at all. If there are no pass identifier tags, the system flags the item for user intervention because the datum is thus unknown. Typically, this is because the system has encountered a .PDF or picture file, which the user must manually assess and align with a predetermined datum. If the number of pass tags is equal to one, the file system moves to step 314 wherein the electronic map file is converted to a predetermined datum.

By way of non-limiting example, the WGS84 datum is used; however any convenient datum may be selected, for example, if a local preference for a particular datum exists. For example, the user might choose to configure the system to output its information according to the United States National Grid for Spatial Addressing (USNG), which is a system of geographic grid references commonly used in United States, the Ordnance Survey Great Britain 1936, which is a system used in Great Britain, the North American Datum, a system used in the North American continent, etc. After the retrieved electronic map is converted to the predetermined datum, the electronic map file is further convertible to a secondary preferred user datum as required by the user. The use of the predetermined datum effectively results in the scale of the first electronic map file being synchronized with a scale of the second electronic map file in a 1:1 ratio.

Returning to step 310, if the number of pass identifier tags is greater than one, the system determines which of the datum maps are best correlated to the area of interest; therefore, at step 316, the system compares the area of interest location with the electronic map. At decision step 318, the system determines whether any of the maps are sufficiently related to the area of interest. If any map is so related, the system proceeds directly to step 314 to convert the electronic map file to the predetermined datum; however, if the maps are not sufficiently related to the area of interest then, at step 320, the system flags the map for user intervention to select the correct datum and proceeds to step 314 to convert the electronic map to WGS84 format. At step 322, the newly converted file is saved to a particular folder, which can be identified by the area of interest, i.e., a particular state, county, city, etc. The area of interest can be as small as one the user desires. The original data file can then be deleted (at step 324) or stored in a mass storage area at the user's option, but is either stored or indexed as "grabber data". As maps are converted, users can generate reports for a particular area of interest.

The inventive method can be combined with a feature for yielding the usable or unusable square footage of a property—a land development yield method. A land parcel development yield method includes obtaining an electronic map file, storing the electronic map file in a computer readable medium, defining an area of interest on the electronic map file, referring to a database to determine whether the database contains at least one restriction value for the parcel of land, referring to a remote database to determine whether the remote database contains an additional restriction value for the parcel of land, the additional restriction value being distinct from the at least one restriction value, combining the at least one restriction value with the additional restriction value to form a plurality of restriction values, and determining a total value of the parcel of land based on the plurality of restriction values. The restriction values can represent an undevelopable square footage of land. The restriction values can also alternatively or additionally represent a developable amount of land, an undevelopable amount of land or an impervious surface ratio. Also, the total value of the parcel of land can be the floor area ratio of the land.

As shown in FIGS. 4a-4d, the development yield method begins at step 402 with entering client information and a property location. At decision step 404, the system determines whether the property location is within the system's database; if so, the system proceeds to step 408 and if not, the system enters the web location for property information retrieval at step 406. At step 408, the system gets information relating to the property location, such as and without limitation: zoning, soils, wetlands, covenants, neighboring sites, historical significance, proposed public projects, utilities, and environmental restrictions. At step 410, the system opens a map for the user to draw an outline of the property location. At steps 412, 414, 416 and 418, the system alternatively or concurrently opens, among other things, electronic versions of an aerial GIS map, a United States Geological Survey Map ("U.S.G.S.") topographical map, a demographic map and a soil map. The system then zooms to the property location and extracts an image (part of steps 412, 414, 416 and 418).

With the electronic maps obtained in steps 412-418, the system at steps 420 and 422, for example, can get lists and definitions of soils within the property line and calculate areas of the property containing each soil. At step 424, the system identifies unusable property areas such as marsh, swamp, water or other water impervious surfaces and flags each area of soil as unusable land. Additionally, at steps 426 and 428, the system has the ability to open a wetland electronic map file, extract an image and, if wetland exists on the property, calculate the unusable area of the property due to the wetland. Similarly, at steps 430 and 432, the system has the ability to open a FEMA electronic map file, extract an image and, if a floodway exists on the property, calculate the unusable area of the property due to the floodway. Other similar maps can be accessed and applied to the property location at the user's discretion, e.g., sensitive species electronic map files (steps 434 and 436), historic electronic map files (steps 438 and 440), protected lands (step 442), forest interior dwelling species ("fids") maps (step 444), easement electronic map files (step 446) and other factors that can potentially limit the use of a property (step 448).

Beginning in step 452, zoning factors are considered and zone identification information is obtained. In step 454, zone density equations and variables are loaded and the total land area on which buildings and other structures can be constructed is calculated in step 454. To this end, the building footprint, required parking (if zoned commercial) is calculated.

At steps 456 and 458, respectively, deed information is uploaded into the system. At steps 460 and 462, National Geodetic Survey Geographic Information Service ("N.G.S.G.I.S.") information is opened and electronic map files are extracted with NGS points identified. If the NGS Point is within a predetermined area of the property, i.e., five hundred feet from the property boundary, the system gets information on the NGS point (alternatively referred to as a "marker") at step 464. The NGS maintains records of landmark characteristics such as height, elevation, and geographic location. These landmarks are "markers." Markers are used as surveying reference points. Alternatively, Global Positioning ("GPS") data can be inserted in lieu of marker information. Further, additional information such as traffic maps 466, public safety information 468 (i.e. distances to nearest hospital, police station and fire station) crime data 470, and census data 472 are obtained by the system. Alternatively, the user can enter custom data 474 into the report.

The system can also generate a report for the property at step 476. With the information generated during the inventive method thus far, the system can provide the user with the capability of determining optimization values for a property. These values can be monetary values, restriction values, a rank (in comparison to other properties or user requirements) or density and usage values. Optionally, these values are compared to a predetermined value. Also, maximum or optimum use values are obtained. For example, if a parcel of land is a particular square footage and has a particular height restriction, the system can calculate how much usable space can be built on that parcel of land. Alternatively, if a person needs a building to be a certain size, the system can review both external and internal databases of properties and restrictions thereto and determine for the user which property meets the required needs the best. The system can also review adjoining properties to determine the effects of adjoining properties on the subject property. For example, the system can analyze whether adjoining parking spaces legally provide the subject property with adequate parking that is in accordance with local law.

Figure 5:
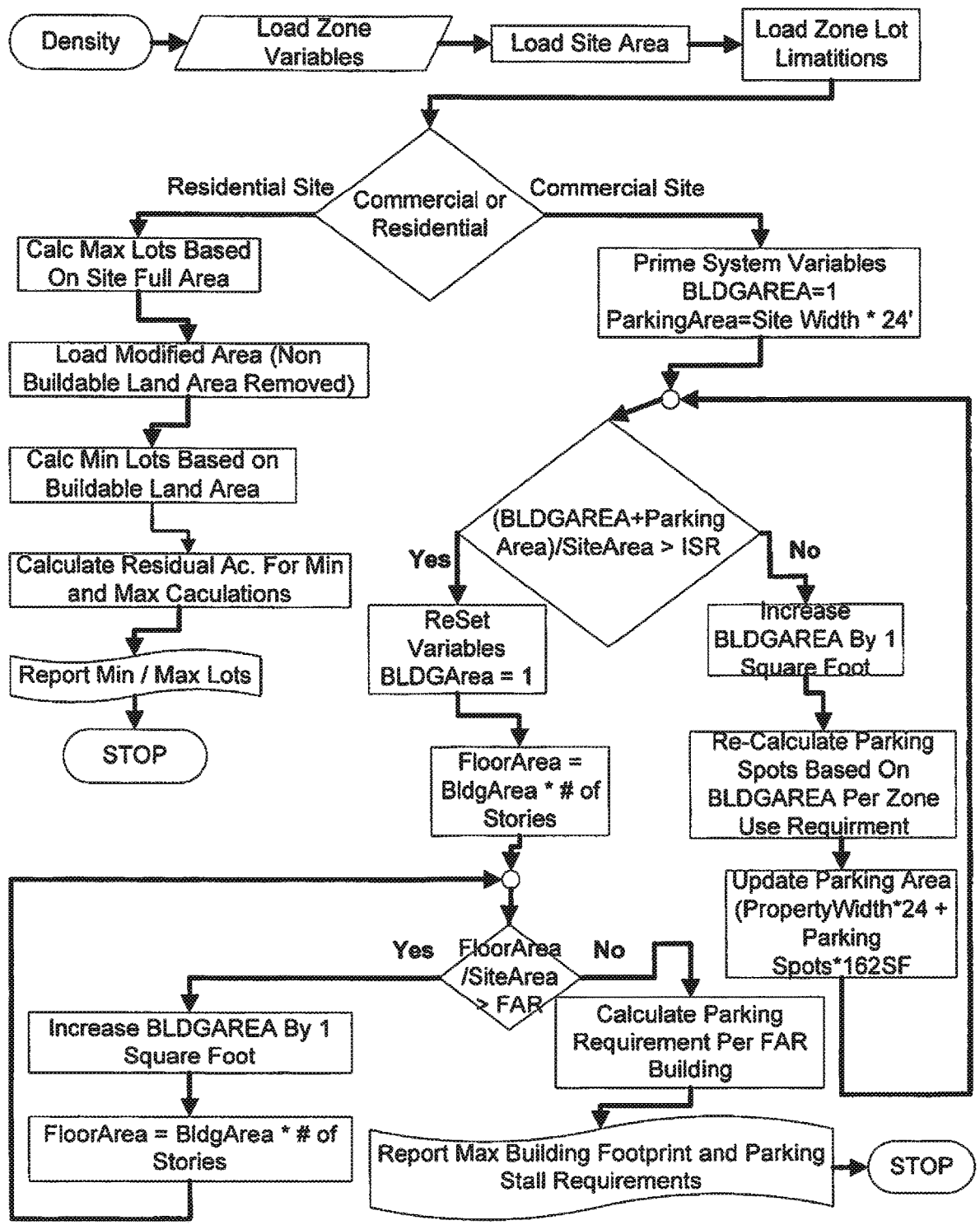
FIG. 5 shows a land optimization/selection method.

With reference to FIG. 5 showing a land optimization/selection method, the system provides a user with help optimizing land space or selecting a parcel of land for an intended purpose. With respect to land optimization, at step 502, a lot is loaded into the system's memory and at step 504, the system determines whether the lot is residential or commercial. A particular section of that land is identified in step 506 *a* or 506 *b*. For residential land, the system at step 508 loads zone lot limitations and calculates the maximum number of lots that can be placed in the zone and site area (at step 510) regardless of the limitations of the lot. The system also determines a modified lot area in view of the limitations of the land at step 512, i.e., it excludes land areas such as environmentally protected areas, cliffs, swamps, etc. on which buildings cannot be constructed and, at step 514, recalculates the amount of buildable land to determine the number of minimum buildable lots. The system is then able to output a report containing the minimum and maximum amount of buildable area on the land at step 516. Additional steps include determining whether the excluded area eliminates the possibility of constructing a building around the excluded area thereby raising the minimum amount of buildable area on the land.

With respect to commercial land after step 506, the system loads zone rules at 518 and sets a building area square foot counter at one and sets a corresponding parking square footage at the product of the land width multiplied by twenty-four at step 520. The system then determines at step 522 whether the building area combined with the parking square footage divided by the site area is greater than the impervious surface ratio. If not, the building area square footage at step 524 is increased by one and the parking area at step 526 is increased by a multiplier of 24+n (where in is the number of times the calculation has been made). At step 528, the parking area is updated and the system returns to step 522. If at step 522 the building area square footage combined with the parking area square footage is greater than the impervious surface area, then the system returns to the previous building area square footage. If at step 522 the building area square footage combined with the parking area square footage is equal to the impervious surface area, then at step 530 the system determines whether the building area square footage divided by the site area is greater than the floor area ratio. If not, the building area is increased by one foot at step 532, multiplied by the number of desired stories at step 534 and the system loops back to step 530. If the building area square footage divided by the site area is greater than the floor area ratio, the system flags the building area square footage as maximum area and suggests modifying the site area at step 536 or identifies to the user that the land size does not comply with the building square footage and the discrepancy should be eliminated. At 538, the results are displayed to the user. A person having ordinary skill in the art will understand that, for land selection based on predetermine user requirements, i.e., selecting a property based on its intended use, this method works in reverse.

All information relating to a property that is obtained by the system is made available to the user. In other words, the system creates a catalogue of information relating to that property that can be referenced by anyone at anytime thereby eliminating the need to go to various sources for various information.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, one or more elements can be rearranged and/or combined, or additional elements may be added. Thus, the present invention is not intended to be limited to the embodiments shown herein but is to be accorded the widest scope consistent with the principles and novel features disclosed herein.

We claim:

1. A method, comprising:
   determining, via at least one computing device, an area of interest on an electronic map file;
   retrieving, via the at least one computing device, a plurality of different maps individually corresponding to a respective one of a plurality of different third party services;
   extracting, via the at least one computing device, a plurality of map portions corresponding to the area of interest from individual ones of the plurality of different maps;
   determining, via the at least one computing device, a zoning factor and an environmental restriction factor for the area of interest from at least one of the plurality of map portions;
   determining, via the at least one computing device, a respective usability metric from each of the plurality of map portions based on the zoning factor and the environmental restriction factor; and generating, via the at least one computing device, a report for the area of interest based in part on the respective usability metric from each of the plurality of map portions.

2. The method of claim 1, further comprising overlaying the plurality of map portions onto the area of interest of the electronic map file, wherein overlaying the plurality of map portions onto the area of interest comprises aligning each of plurality of map portions with the area of interest based on a datum associated with the area of interest and a respective data associated with each of the plurality of map portions.

3. The method of claim 1, wherein extracting the plurality of different maps further comprises:
   opening, via the at least one computing device, a particular map of the plurality of different maps;
   zooming, via the at least one computing device, into the area of interest in the particular map; and
   extracting and storing, via the at least one computing device, a particular map portion of the plurality of map portions corresponding to the area of interest.

4. The method of claim 1, wherein the plurality of different maps comprises at least one of: an aerial GIS map, a United States Geological Survey Map ("U.S.G.S.") topographical map, a demographic map, and a soil map.

5. The method of claim 1, wherein the respective usability metric for a first map portion comprises a quantity of unusable property area.

6. The method of claim 1, further comprising determining an amount of buildable area on the area of interest based on the respective usability metric from each of the plurality of map portions, wherein the report for the area of interest comprises the amount of buildable area, wherein the amount of buildable area comprises a maximum amount of buildable area and a minimum amount of buildable area for the area of interest.

7. A system, comprising:
   a data store comprising a plurality of electronic map files; and
   at least one computing device in communication with the data store, the at least one computing device being configured to:
      identify an electronic map file of the plurality of electronic map files;
      determine an area of interest on the electronic map file;
      retrieve a plurality of different maps individually corresponding to a respective one of a plurality of different third party services;
      extract a plurality of map portions corresponding to the area of interest from individual ones of the plurality of different maps;
      determine a zoning factor and an environmental restriction factor for the area of interest from at least one of the plurality of map portions;
      determine a respective usability metric from each of the plurality of map portions based on the zoning factor and the environmental restriction factor; and
      generate a report for the area of interest based in part on the respective usability metric from each of the plurality of map portions.

8. The system of claim 7, wherein the at least one computing device is configured to convert a datum for at least one of the plurality of map portions to a predetermined datum based at least in part on a datum modification equation.

9. The system of claim 7, wherein the at least one computing device is configured to:
   receive survey data from a particular third party service;
   determine whether a marker in the survey data is within a predetermined distance from a property boundary of the area of interest; and
   in response to the marker being within the predetermined distance, associate information corresponding to the marker with the area of interest.

10. The system of claim 7, wherein the at least one computing device is configured to retrieve the plurality of different maps by spidering, via a spider program, a plurality of servers to obtain the plurality of different maps.

11. The system of claim 7, wherein the at least one computing device is further configured to overlay a first image of the area of interest with a second image from at least one of the plurality of map portions.

12. A non-transitory computer-readable medium embodying a program that, when executed by at least one computing device, causes the at least one computing device to:
   determine an area of interest on an electronic map file;
   retrieve a plurality of different maps individually corresponding to a respective one of a plurality of different third party services;
   extract a plurality of map portions corresponding to the area of interest from individual ones of the plurality of different maps;
   determine a zoning factor and an environmental restriction factor for the area of interest from at least one of the plurality of map portions;
   determine a respective usability metric from each of the plurality of map portions based on the zoning factor and the environmental restriction factor; and
   generate a report for the area of interest based in part on the respective usability metric from each of the plurality of map portions.

13. The non-transitory computer-readable medium of claim 12, wherein the program further causes the at least one computing device to extract the plurality of map portions by determining that the area of interest at least partially coincides with each of the plurality of different maps.

14. The non-transitory computer-readable medium of claim 12, wherein the program is further configured to:
   determine informational data corresponding to the area of interest; and
   generate the report comprising the informational data, wherein the information data comprises at least one of: traffic data, crime data, and census data.

15. The non-transitory computer-readable medium of claim 12, wherein the program is further configured to overlay a first image of the electronic map file with a second image from at least one of the plurality of different maps.

16. The non-transitory computer-readable medium of claim 12, wherein the program is further configured to generate a yield for the area of interest based the respective usability metric from each of the plurality of map portions.

17. The non-transitory computer-readable medium of claim 16, wherein the yield comprising at least one optimization value for the area of interest.

18. The non-transitory computer-readable medium of claim 12, wherein the program is further configured to determine whether at least one restriction value corresponds to the area of interest.

19. The method of claim 1, wherein the zoning factor comprises a zoning density for the area of interest, and determining the zoning density by determining an allowable area that structures are allowed under zoning rules to be constructed on the area of interest.

20. The non-transitory computer-readable medium of claim 16, wherein the yield is generated as a function of zoning maps, zoning use data, and zoning density tabular data.

\* \* \* \* \*